United States Patent [19]

Allen

[11] Patent Number: 4,838,292
[45] Date of Patent: Jun. 13, 1989

[54] TEEPEE STRUCTURE

[76] Inventor: Sebree J. Allen, Rte. 2, Kevil, Ky. 42053

[21] Appl. No.: 197,333

[22] Filed: May 23, 1988

[51] Int. Cl.⁴ .......................................... E04H 15/24
[52] U.S. Cl. ........................................ 135/100; 52/82
[58] Field of Search ............... 135/100, 101; 52/82, 52/80

[56] References Cited

U.S. PATENT DOCUMENTS

| | | | |
|---|---|---|---|
| 488,451 | 12/1892 | Quartermass | 52/82 |
| 795,630 | 7/1905 | Lynn | 52/311 X |
| 1,713,050 | 5/1929 | Natzel et al. | 52/311 X |
| 1,796,237 | 3/1931 | Bowman et al. | 52/236.1 X |
| 3,042,052 | 7/1962 | Des Rosier | 135/100 |
| 3,176,698 | 4/1965 | Warner | 135/100 |
| 3,230,911 | 1/1966 | Gailock, Jr. | 52/265 |
| 3,258,020 | 6/1966 | McDonald | 135/100 |
| 3,495,365 | 2/1970 | Blaski | 52/82 X |
| 3,779,259 | 12/1973 | Fuller | 135/100 X |
| 3,953,949 | 5/1976 | O'Sheeran | 135/100 X |
| 3,999,337 | 12/1976 | Tomassetti et al. | 52/82 |
| 4,064,663 | 12/1977 | Moss | 52/82 X |
| 4,144,630 | 3/1979 | Kelly | 52/82 X |
| 4,285,174 | 8/1981 | Knight | 52/82 X |
| 4,488,392 | 12/1984 | Pearcey et al. | 52/742 |
| 4,655,013 | 4/1987 | Ritland | 52/82 X |
| 4,720,947 | 1/1988 | Yacaboni | 52/82 X |

*Primary Examiner*—David A. Scherbel
*Assistant Examiner*—Caroline D. Dennison
*Attorney, Agent, or Firm*—Harrington A. Lackey

[57] ABSTRACT

A teepee structure having a plurality of circumferentially spaced poles of different lengths forming a conical frame covered by an insulated cover member or skin and mounted upon a cylindrical foundation wall submerged in the ground. The upper end portions of the longest poles are fastened to a top ring member which is covered by a cap member covering the ring member, upper end portions of the poles and the upper end portions of the cover member.

17 Claims, 3 Drawing Sheets

TEEPEE STRUCTURE

BACKGROUND OF THE INVENTION

This invention relates to a building structure, and more particularly to a protective teepee building structure.

The basic teepee structure including the lodge poles arranged in conical form covered by hides of the American Indians of the western plains is well known.

Furthermore, more rigid types of teepee structures are also well known, as illustrated in the following U.S. patents:

| | | |
|---|---|---|
| 488,451 | Quatermass | Dec. 20, 1892 |
| 795,630 | Lynn | July 25, 1905 |
| 1,713,050 | Natzel et al | May 14, 1929 |
| 1,796,237 | Bowman et al | Mar. 10, 1931 |
| 3,042,052 | Des Rosier | July 3, 1962 |
| 3,176,698 | Warner | Apr. 6, 1965 |
| 3,230,911 | Garlock, Jr. | Jan. 25, 1966 |
| 3,953,949 | O'Sheeran | May 4, 1976 |

All of the above patents, except Des Rosier and Warner, disclose solid teepee building type structures. The broad idea of utilizing a teepee building structure to withstand winds and storms, because of its conical shape, is old, as disclosed in the Quatermass U.S. Pat. No. 488,451.

The Garlock patent discloses a teepee-type construction design primarily for a shelter against radioactive fall-out particles.

FIG. 1 of O'Sheeran discloses a teepee structure which is nearly equilateral in vertical cross-section.

The following U.S. patents disclose various types of domed building structures:

| | | |
|---|---|---|
| 3,495,365 | Blaski | Feb. 17, 1970 |
| 4,144,680 | Kelly | Mar. 20, 1979 |
| 4,488,392 | Pearcey et al | Dec. 18, 1984 |

The Kelly and Pearcey et al patents disclose domed structures having laminated wall or shell structures.

SUMMARY OF THE INVENTION

The teepee building structure made in accordance with this invention includes a plurality of uniformly spaced poles supported upon a circumferential sunken base or foundation structure and converging upwardly toward a ring member to which the upper ends of the poles are fastened, and a domeshaped cap fitting over the ring and the upper ends of the poles.

In a preferred form of the invention, the poles utilized in the teepee structure are arranged in sets of different lengths so that a greater proportion of the pole structure is disposed in the lower section of the teepee structure where the circumference is greater and more support for the wall structure is required.

Furthermore, a teepee structure made in accordance with this invention incorporates a wall or shell structure comprising laminations of support netting or mesh, thick insulation and an outer weather-repellent cover, which will provide maximum protection for the occupants of the teepee structure.

Another object of this invention is to provide a teepee structure having a conical pole arrangement permitting adequate door and window openings between the poles in the wall or shell structure to maintain the integrity of the poles.

DESCRIPTION OF THE PREFERRED EMBODIMENT

Figure 1:
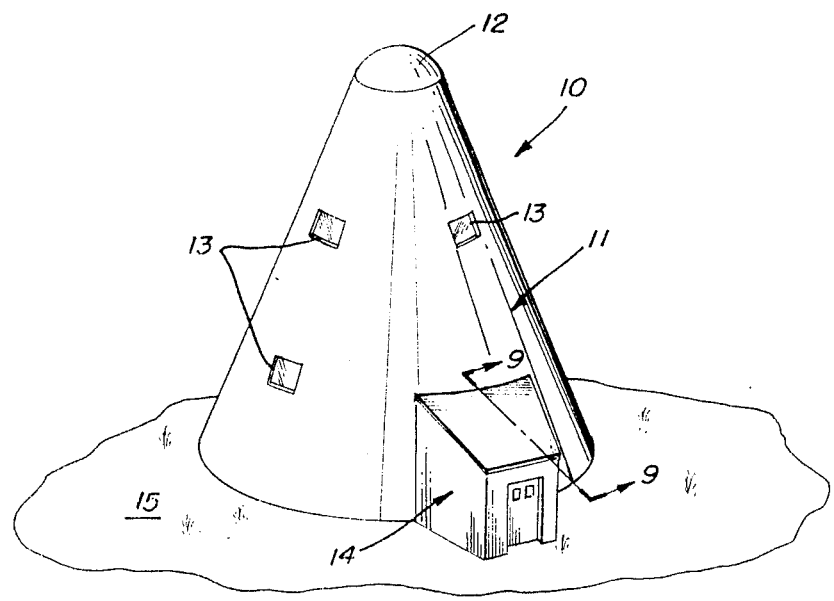
FIG. 1 is a front perspective view of a teepee structure made in accordance with this invention.
Figure 2:
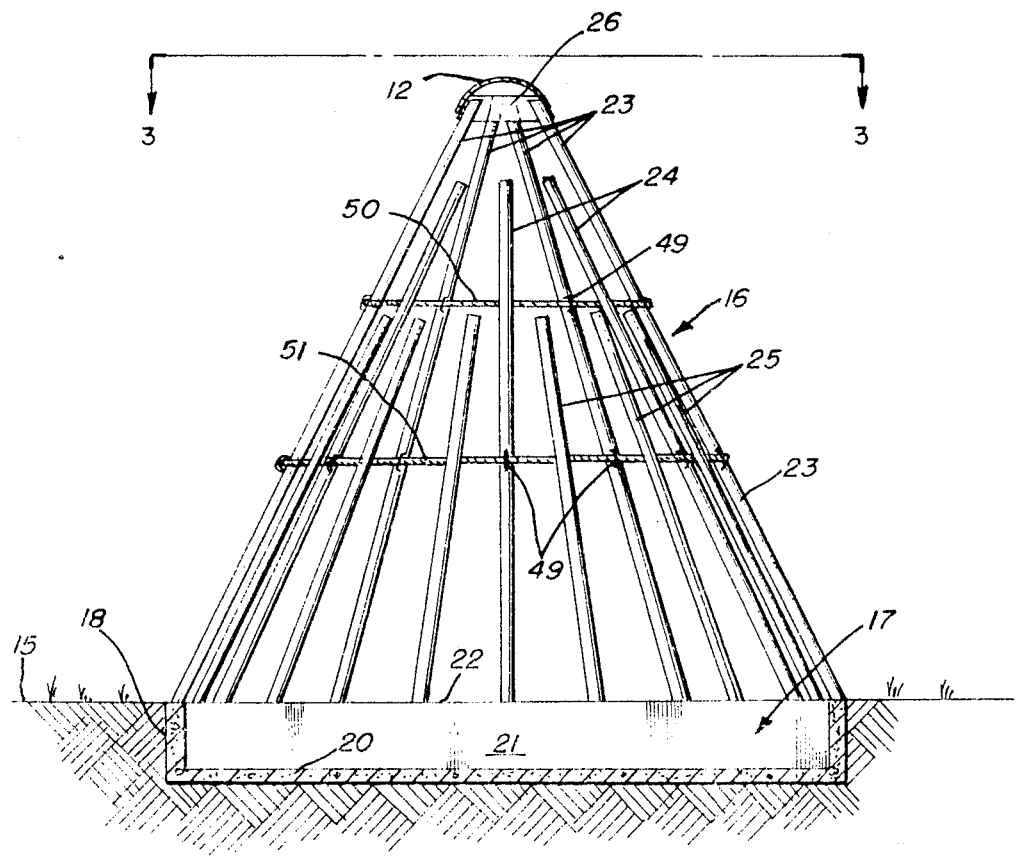
FIG. 2 is an enlarged elevational view of the pole frame of the teepee building structure, made in accordance with this invention, with the laminated wall or shell removed, with the dome and foundation structure showing in section; and without the pole fasteners.
Figure 3:
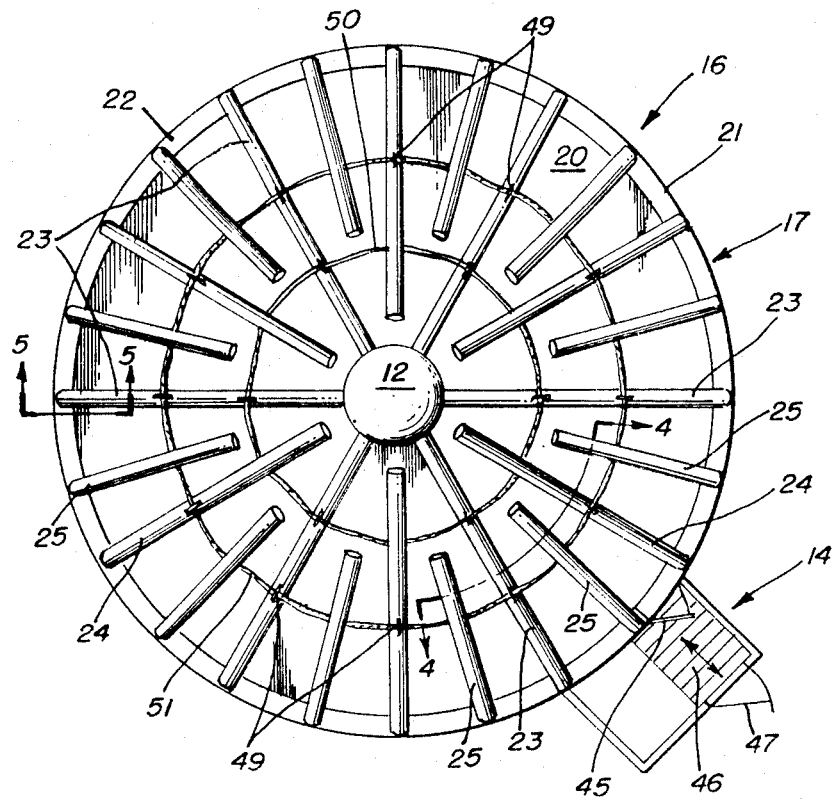
FIG. 3 is a top plan view of the frame structure taken along the line 3—3 of FIG. 2.
Figure 5:
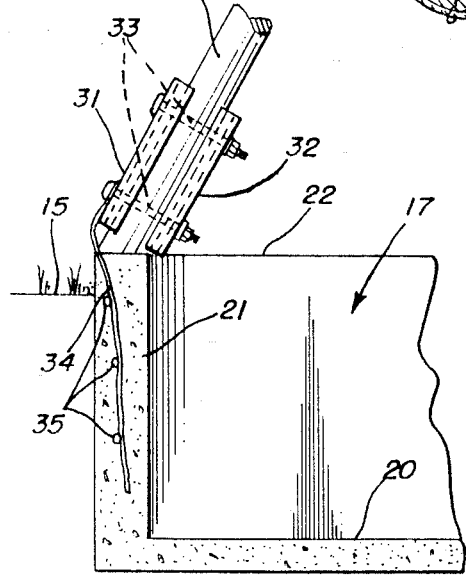
FIG. 5 is an enlarged fragmentary section taken along the line 5—5 of FIG. 3, illustrating the fastener devices for the lower end of a pole.

Referring now to the drawings in more detail, FIG. 1 discloses a teepee building structure 10 made in accordance with this invention incorporating a conical wall structure or shell 11, a domed cap member 12, windows 13, and a vestibule 14, supported upon a ground surface 15. FIGS. 2 and 3 disclose the basic teepee frame structure 16 mounted upon a cylindrical foundation or base structure 17 submerged within a corresponding hole or recess 18 within the ground surface 15. The foundation structure 17 preferably includes a circular floor 20 and a cylindrical wall 21, preferably monolithically formed of reinforced concrete. The wall 21 terminates in a circular top preferably flat surface 22. The top surface 22 may be substantially flush with the ground level 15, as illustrated in FIG. 2, or it may be slightly above the ground surface 15, as illustrated in FIG. 5.

The frame structure 16 includes a plurality of elongated poles converging upward from the foundation wall 21, as illustrated in FIGS. 2 and 3. The poles include a first set of a plurality of long poles 23, a second set of a plurality of intermediate poles 24, which are not as long as the long poles 23, and a third set of a plurality of short poles 25, which are not as long as the intermediate poles 24.

The long poles 23 are uniformly spaced at wide circumferential distances around the periphery of the foundation 17. The intermediate poles 24 are also uniformly spaced about the periphery of the foundation 17 and preferably alternately spaced between the pairs of adjacent long poles 23. The short poles 25 are greater in number than either the intermediate poles 24 or long poles 23 and are preferably alternately spaced between a long pole 23 and an intermediate pole 24. All of the poles 23, 24, and 25 are arranged in the same conical plane so as to provide a support for the conical shell 11.

The length and spacing of the three sets of poles are such as to provide roughly substantially uniform open spaces between the poles in the lower and upper portions of the frame structure 16. Moreover, there is greater supporting pole surface in the lower portions of the teepee building 10 than there is in the upper portions where the diameter is smaller and less support for the shell structure 11 is required.

As disclosed in FIG. 2, the level to which the short poles 25 project is a little over half the height of the teepee building 10.

In one form of the teepee building 10 as disclosed in the drawings, and particularly in FIGS. 2 and 3, there are six long poles 23, each of which may be approximately 36' long, uniformly circumferentially spaced about the foundation wall 21. Equally spaced between each pair of adjacent long poles 23 is one of six intermediate poles 24 approximately 30' long. Each intermediate pole 24 is preferably equally spaced between each pair of long poles 23.

As disclosed in FIGS. 2 and 3, there are twelve short poles, each of which may be approximately 20' feet long, and each short pole is preferably equally spaced between an intermediate pole 24 and a long pole 23. Thus, all of the poles 23, 24, and 25 are uniformly circumferentially spaced apart at their base, or lower ends which rest upon the top surface 22 of the cylindrical side wall 21 of the foundation 17.

Also in a preferred form of the invention, where each long pole 23 is approximately each 36' long, the diameter of the cylindrical foundation wall 21 is also approximately 36', so that the diameter of the foundation 17 and the diametrically opposed long poles 23 define essentially an equilateral triangle in the vertical dimension of the teepee structure.

Figure 6:
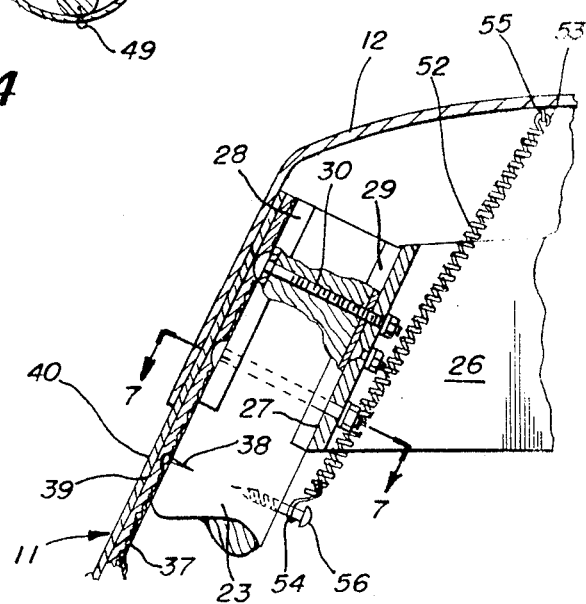
FIG. 6 is an enlarged fragmentary elevational section of the upper portion of the teepee frame structure, illustrating the means for fastening the upper ends of the poles to the ring member and to the cap member.
Figure 7:
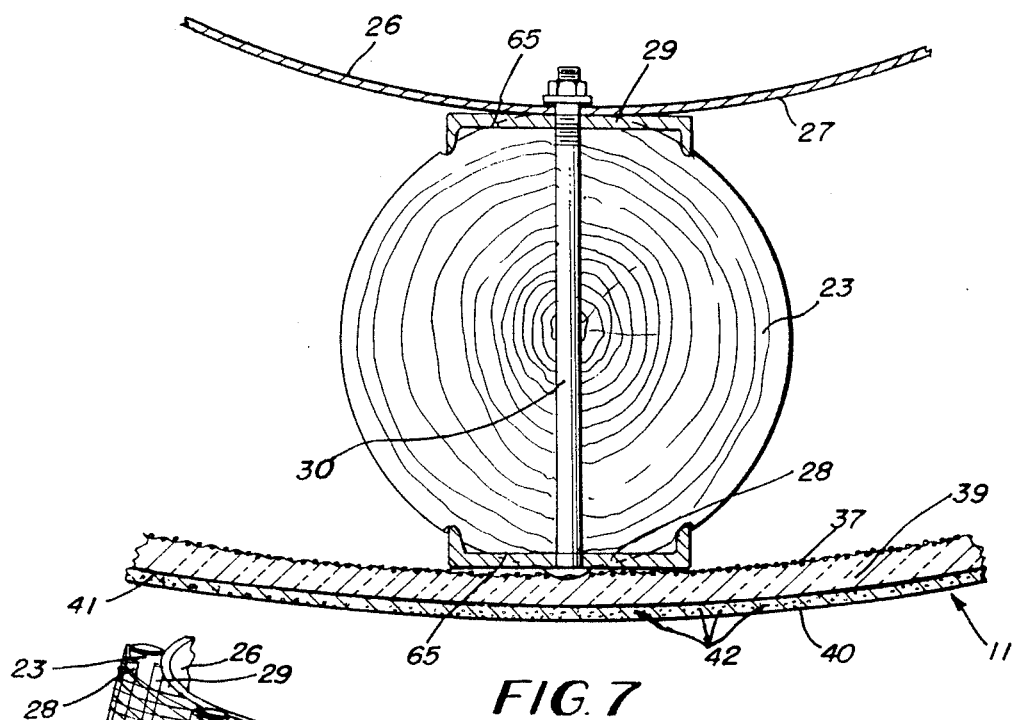
FIG. 7 is a greatly enlarged fragmentary section taken along the line 7—7 of FIG. 6.
Figure 8:
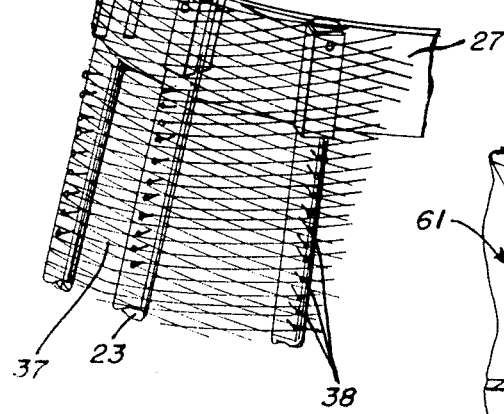
FIG. 8 is a perspective view of the upper portion of the frame structure with the cap member removed, and with only the supporting mesh of the shell structure illustrated.

The upper end portions of each of the long poles 23 converge against an annular top ring member 26, which is disclosed in FIGS. 6, 7, and 8 as having a frusto-conical cross-section with an outer face surface 27.

The top or upper end portion of each long pole 23 is secured to the top ring member 26 by a top fastener mechanism including an outer channel member 28 and an opposed inner channel member 29 encapsulating the upper end portion of the long pole 23. Long bolts 30 extend radially inward through the outer channel member 28, the upper end portion of the long pole 23, the inner channel member 29 and the ring member 26, as best illustrated in FIGS. 6 and 7. As illustrated in FIG. 7, the web of each inner channel member 29 is substantially flush against the face surface 27 of the ring member 26. In a preferred form of the invention, the opposed inner and outer surfaces of the top portion of each long pole 23 is mortised to provide flat recesses 65 for receiving the webs of the channel members 28 and 29 (FIG. 7).

The lower end portion of each of the poles 23, 24, and 25 is preferably anchored to the foundation wall 21 so that the bottom end of each pole fits flush against the top surface 22 of the foundation wall 21. The anchoring device for the lower end portion of each pole is best disclosed in FIG. 5, using the lower portion of a long pole 23 as illustrated. The lower fastener device is substantially similar to the top fastener device, since it includes a pair of outer and inner channel members 31 and 32 encapsulating the lower end of the pole and fastened together by long bolts 33. An anchor strap 34, preferably made of steel, is formed in the reinforced concrete wall 21 and preferably tied to the reinforcing rods 35 so that the strap 34 projects upwardly across the web of the outer channel member 31. The upper end portion of the anchor strap 34 is provided with a hole, not shown, through which the lower fastener bolt 33 projects to secure the anchor strap 34 to the lower end portion of the long pole 23. The anchor strap 34 may also project farther upward and be provided with another hole for the upper fastener bolt 33 to extend through, if desired. In a preferred form of the invention, the lower portions of each of the poles 23, 24, and 25 is provided with the same fastener device, as illustrated in FIG. 5.

In a preferred form of the shell or wall structure 11, a screen or mesh-like fabric, such as the nylon mesh support sheet 37 (FIGS. 6, 7 and 8) is laid across the outer surfaces of the poles 23-25 and loosely held upon the poles by nails 38, such as roofing nails, driven partially into the outer surface of the respective poles 23, 24, and 25. Preferably, the mesh support sheet is unwound from its roll and wound spirally about the outer surface of the poles until it completely covers the entire pole frame structure.

Upon the mesh support sheet 37 is spread, either in bulk form, or in sheets, or by spraying, a relatively thick insulation layer 39. In a preferred form of the shell or wall structure 11, cellulose insulation is sprayed in a thick layer on top of the mesh support sheet 37. Then an outer layer 40 of weather-repellant or weather-resistant material, such as fiberglass is laid or sprayed upon the insulation layer 39 to form the outer protective cover or coating for the teepee building 10. Preferably, the fiberglass outer cover layer 40 incorporates a plurality of reflective metallic particles 42, (FIG. 7), such as aluminum or titanium, to reflect radiation. Such a reflective cover layer 40 would render the interior of the building 10 cooler by reflection of the sun's rays. It is also contemplated that the reflective material could also be capable of deflecting or reflecting radiant energy emanating from an atomic blast or fall-out.

As an optional feature, it is also contemplated for protection against atomic radiation or fall-out to provide a heavy coat of lead paint 41 between the outer cover layer 40 and the insulation 39, as illustrated in FIG. 7.

The foundation structure 17 is preferably sunken below the ground surface 15 in a corresponding cylindrical hole 18 to a depth of approximately four feet for several reasons. First of all, the sunken foundation structure 17 will provide a more stable foundation for a frame structure 16 above ground to resist elements from the weather, such as wind, rain and snow, as well as against any explosion or atomic blasts.

Furthermore, the sunken foundation structure 17 will permit the surrounding ground or earth to function as an insulation medium to improve the economy of heating and cooling the interior of the structure 10.

Figure 9:
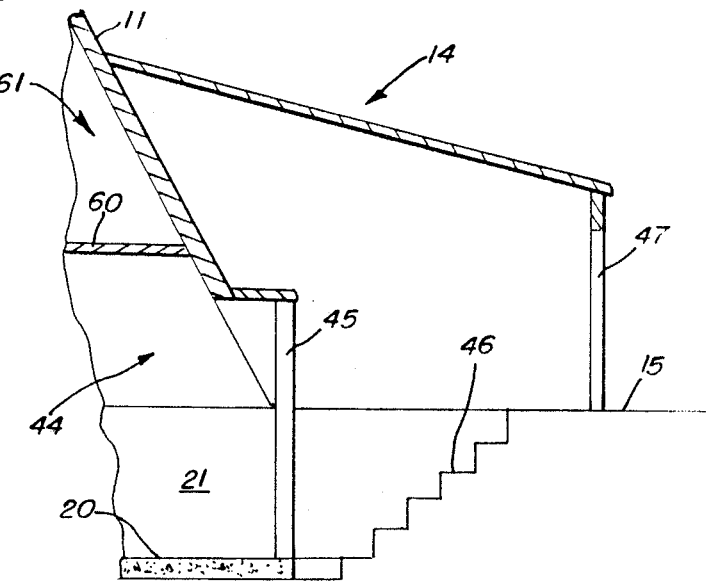
FIG. 9 is an enlarged fragmentary section taken along the line 9—9 of FIG. 1.

Because of the angular attitude of all of the poles 23-25, the interior space above the ground and particularly at the upper levels of the teepee structure 10 become increasingly restricted. Therefore, as best illustrated in FIG. 9, the first floor living space 44 occupies more room than a pure conical structure because of the four foot cylindrical vertical foundation wall 21. The four foot cylindrical foundation wall 21 permits more furniture to be located toward the outer periphery of the living space 44. Furniture, not greater than the height of the foundation wall may be placed against the vertical wall surface 21. Moreover, a person standing in the living space 44 may stand closer to the exterior wall than if the wall sloped from the floor upward in a conical pattern.

As illustrated in FIG. 9, a front door 45 opening into the first floor living space 44 opens into the vestibule 14 and is provided with steps 46 leading up to the ground level 15 and through an outer door 47. As illustrated in FIG. 3, the door 45 is mounted between a pair of adjacent poles 24 and 25. Although not illustrated, the windows 13 are formed through the wall or shell 11 and between a pair of adjacent poles, without the necessity of cutting or interfering with the integrity of a pole.

The upper end portions of the intermediate poles 24 are secured in place by an intermediate fastening device including a circumferential cable 50 which is interwoven between the adjacent intermediate poles 24 and long poles 23, as illustrated in FIGS. 2 and 3.

Figure 4:
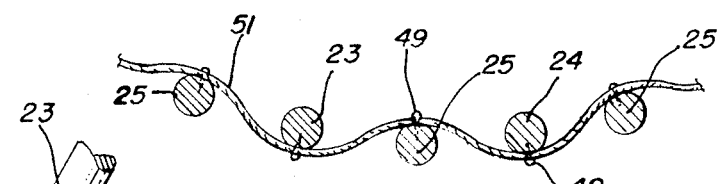
FIG. 4 is an enlarged fragmentary section taken along the line 4—4 of FIG. 3.

In like manner, the upper end portions of the short poles 25 are fastened together and in the conical pattern of the frame structure 16 by a lower fastening endless cable 51, which is likewise interwoven between the adjacent short poles 25, long poles 23, and intermediate poles 24, as best illustrated in FIGS. 2, 3, and 4.

The cables 50 and 51 may be secured to the respective poles 23, 24, and 25 by staples 49 or other fastening devices.

As best illustrated in FIGS. 2 and 3, the upper cable 50 in the intermediate fastening device extends over the exterior surfaces of all of the long poles 23 and beneath the interior surfaces of all of the intermediate poles 24. As disclosed in the drawings, the overlying portions of the upper cable 50 are secured or fastened by staples 49 to the exterior surfaces of the long poles 23.

In a like manner, the lower cable 51 of the lower fastening device extends over and against the exterior surfaces of all of the long poles 23, over and against the exterior surfaces of all of the intermediate poles 24 and beneath and against the interior surfaces of the short poles 25, as illustrated in FIGS. 2, 3, and 4. All of the overlying portions of the lower cable 51 are secured or fastened to the exterior surfaces of the corresponding long poles 23 and intermediate poles 24 by staples 49. The underlying portions of the cable 51 may also be fastened to the interior surfaces of the short poles 25, as shown in FIG. 4, and if desired.

After the poles 23-25 are fastened in their locations within the frame structure 16 and secured to the top ring member 26, the dome cap member 12, which has a lower diameter greater than the diameter or transverse dimension of the top ring member 26, is fitted over the ring member 26, the upper end portions of the long poles 23, and the upper end portions of the laminated wall structure 11, as best illustrated in FIGS. 1, 6, and 7. The dome cap member 12 may be mounted in its operative position by securing the interior of the dome member 12 to one or more of the upper portions of the long poles 23 by any type of fastening device. One type of fastening device is disclosed in FIG. 6 in the form of an elongated spring 52 having upper and lower hooks 53 and 54, respectively, engaging an eye 55 fixed to the interior surface of the cap member 12 and a fastener screw 56 fixed in the pole 23. Other types of fasteners for the cap member 12 may be utilized, if desired.

With the dimensions previously given for the length of the poles 23-25, the teepee building structure 10 is capable of housing a multiple-story living quarters. As illustrated in FIG. 9, the horizontal partition 60 represents the ceiling of the first floor living space 44 and the floor of the second floor living space 61.

It will now be seen that a teepee building structure 10 has been designed which incorporates a relatively simple but stable structure to provide maximum resistance to weather elements, such as wind, rain, snow, and solar radiation. Moreover, the structure is designed to provide resistive protection against earthquakes, fall-out and atomic radiation and blasts.

Furthermore, the entire structure is economical and capable of providing adequate living space for a multistory habitation with a minimum amount of structural materials.

What is claimed is:

1. A teepee structure comprising:
   (a) a circumferential foundation base,
   (b) a conical frame comprising a plurality of poles having bottom end portions seated on said foundation base at spaced intervals and having upper end portions converging upward, said poles having exterior and interior surfaces,
   (c) said poles comprising a first set of circumferentially spaced long poles and a second set of circumferentially spaced shorter poles of lesser height than said long poles, said shorter poles being alternately spaced between said long poles,
   (d) a top ring member,
   (e) top fastener means securing the upper end portions of said long poles to said top ring member,
   (f) said top ring member being spaced above the upper end portions of said shorter poles,
   (g) fastening means securing said shorter poles in spaced relationship to said long poles, and
   (h) an insulated cover member secured to the exterior surfaces of said poles from said foundation base to said top ring member, said cover member and poles enclosing a living space.

2. The invention according to claim 1 in which said second set of shorter poles comprise a second set of intermediate poles and a third set of short poles, said short poles being of lesser height than said intermediate poles, said short poles being circumferentially spaced between said long poles and said intermediate poles, said fastening means comprising intermediate fastening means securing said intermediate poles in spaced relationship to said long poles and lower fastening means securing said short poles in spaced relationship to said intermediate poles and said long poles.

3. The invention according to claim 2 in which said intermediate fastening means comprises an intermediate, flexible linear member interwoven between said long poles and said intermediate poles, and said lower fastening means comprises a lower, flexible linear member interwoven between said short poles, said intermediate poles, and said long poles.

4. The invention according to claim 3 in which said intermediate, flexible linear member extends above and in engagement with the exterior surfaces of each of said long poles and beneath the interior surface of each of said intermediate poles.

5. The invention according to claim 4 further comprising at least one fastener member for securing said intermediate flexible linear member to at least one of said long poles.

6. The invention according to claim 4 in which said lower, flexible linear member extends over and in engagement with the exterior surface of each of said long poles and said intermediate poles, and extends beneath each of said short poles.

7. The invention according to claim 6 further comprising a fastener member securing said lower flexible linear member to at least one of said poles.

8. The invention according to claim 7 in which said intermediate, flexible linear member extends over the exterior surface of each of said long poles and beneath the interior surface of each of said intermediate poles, said intermediate flexible linear member being spaced above the upper end portions of said short poles.

9. The invention according to claim 1 in which said foundation base comprises a floor and a circumferential wall projecting upward from said floor and forming a circumferential top wall surface, said bottom end portions of said poles being seated on said top wall surface at spaced intervals.

10. The invention according to claim 9 further comprising a ground support surface having a ground level, said foundation base being received within a corresponding recess within said ground support surface.

11. The invention according to claim 9 further comprising anchor means securing the bottom end portions of said poles to said foundation base.

12. The invention according to claim 1 in which said insulated cover member comprises an inner layer of supporting mesh material, an intermediate layer of substantially thick, thermal insulation material and an outer layer of flexible weather-resistant material.

13. The invention according to claim 12 in which said outer layer comprises fiberglass impregnated with reflective metallic particles.

14. The invention according to claim 1 in which said top ring member is frusto-conical converging upward, said top fastener means comprises a fastener bracket for the upper end portion of each of said long poles comprising an inner channel member and an outer channel member on opposite corresponding interior and exterior surfaces of said upper end portion of said long pole, and an elongated bolt member extending through both said channel members, said corresponding upper end portion of said long pole, and said top ring member.

15. The invention according to claim 14 in which said top ring member has an outer face, each said inner channel member being mounted flush against said outer face, said poles being mounted on the outside of said top ring member.

16. The invention according to claim 15 in which said cover member lies against each of said outer channel members, and further comprising a domed shaped cap member of larger transverse cross-sectional dimension than said top ring member, said cap member being mounted above and covering said top ring member and said upper end portions of said long poles, and lying against the exterior surface of said cover member.

17. The invention according to claim 1 further comprising an access opening and window openings through said cover member communicating with said living space.

* * * * *